(12) United States Patent
Servaites et al.

(10) Patent No.: US 11,744,408 B2
(45) Date of Patent: Sep. 5, 2023

(54) REMOVABLE HANDLE FOR COOKWARE

(71) Applicant: Ensembl Inc., Montreal (CA)

(72) Inventors: Jeffrey Servaites, Oakland, CA (US); Christopher Harsacky, Walnut Creek, CA (US); Elizabeth K. Swanson, Montreal (CA)

(73) Assignee: Ensembl Inc., Montreal (CA)

( * ) Notice: Subject to any disclaimer, the term of this patent is extended or adjusted under 35 U.S.C. 154(b) by 297 days.

(21) Appl. No.: 17/045,673

(22) PCT Filed: Apr. 10, 2019

(86) PCT No.: PCT/CA2019/000060
§ 371 (c)(1),
(2) Date: Oct. 6, 2020

(87) PCT Pub. No.: WO2019/195917
PCT Pub. Date: Oct. 17, 2019

(65) Prior Publication Data
US 2021/0022560 A1     Jan. 28, 2021

(30) Foreign Application Priority Data
Apr. 13, 2018 (CA) ................................ CA 3001400

(51) Int. Cl.
*B65D 25/10*     (2006.01)
*A47J 45/07*     (2006.01)

(52) U.S. Cl.
CPC .................................. *A47J 45/071* (2013.01)

(58) Field of Classification Search
CPC ........... A47J 47/07; A47J 47/071; A47J 47/10
(Continued)

(56) References Cited

U.S. PATENT DOCUMENTS 3,798,706 A * 3/1974 Wolfson ................ A47J 45/071
                                                           220/759
6,250,493 B1 * 6/2001 Kwan ................... A47J 45/071
                                                           220/759
(Continued)

FOREIGN PATENT DOCUMENTS

DE     1753149 A1     7/1971
DE     2510894 A1     9/1976
JP     5815009 B2     11/2015

OTHER PUBLICATIONS

International Preliminary Report on Patentability dated Jul. 20, 2020 for App. No. PCT/CA2019/000060.
(Continued)

*Primary Examiner* — John K Fristoe, Jr.
*Assistant Examiner* — Elizabeth J Volz
(74) *Attorney, Agent, or Firm* — Ryan T. Grace; Advent, LLP

(57) ABSTRACT

The present invention relates to a removable cookware handle having an elongated handle section. The elongated handle section has first and second ends, wherein at the first end of the handle section there is the means for removable attachment to the attachment point on a cookware container and a means for locking the removable handle to the attachment point. The attachment point in on the cookware container comprises a bracket that has a depending section attached to a side wall of the cookware container and a flange at the top edge of the depending section and extending outwardly from the side wall of the cookware container. A non-circular elongated opening is centrally located through the flange and generally orientated with its longitudinal axis generally parallel to the side wall of the cookware container. The opening is sized and shaped to engage with the means for removable attachment on the handle.

20 Claims, 9 Drawing Sheets

SECTION A-A

(58) Field of Classification Search
USPC .......................... 220/753, 759, 769; 16/422
See application file for complete search history.

(56) References Cited

U.S. PATENT DOCUMENTS

2017/0319012 A1    11/2017  Dodane et al.
2018/0035842 A1*   2/2018   Stumphauzer .......... A47J 36/06

OTHER PUBLICATIONS

International Search Report dated Jul. 17, 2019 for App. No. PCT/CA2019/000060.

* cited by examiner

REMOVABLE HANDLE FOR COOKWARE

FIELD OF THE INVENTION

This invention generally relates to an improved design for removable cookware handles (or removable handles).

DESCRIPTION OF THE PRIOR ART

Cookware with detachable handles, more specifically removable cookware handles, are used in order to allow for more compact, effective and efficient storage of cookware. Removable handle cookware is typically comprised of a set of containers of different sizes and a removable handle with an attachment end that connects with a flange on the containers. The removable handles are used as an efficient way to conserve space and money as you can use the same handle for all containers that have an acceptable attachment point.

The known removable handles are subject to loose connections with the attachment point which causes unwanted movement of the container when the handle is engaged.

The usual placement of lock/unlock buttons on known removable handles is located on top of the handle where a user would normally place their thumbs and is thus subject to accidental disengagement.

SUMMARY OF THE INVENTION

The present invention provides a removable handle that creates a user-friendly and secure connection at its attachment point to the corresponding container.

In one embodiment the removable handle for removable attachment to an attachment point on a cookware container comprises an elongated handle section. The elongated handle section has first and second ends, wherein at the first end of the handle section there is the means for removable attachment to the attachment point on a cookware container and a means for locking the removable handle to the attachment point. The attachment point on the cookware container comprises a bracket that has a depending section attached to a side wall of the cookware container and a flange at the top edge of the depending section and extending outwardly from the side wall of the cookware container. A non-circular elongated opening is centrally located through the flange and generally orientated with its longitudinal axis generally perpendicular to a longitudinal axis of the elongated handle section and generally parallel to the side wall of the cookware container. The opening is sized and shaped to engage with the means for removable attachment on the handle.

The means for removable attachment to the attachment point comprises a horizontal body section having top and bottom surfaces and first and second ends. On the bottom surface of the body section adjacent the first end is a thicker portion of the body section, said thicker portion sized and shaped to fit snugly with the opening on the flange and in the embodiment illustrated extend below the bottom surface of the flange. At the first end of the horizontal body section in the embodiment illustrated, a horizontal tab section extends outwardly from the bottom surface of the thicker portion of the body section to extend under the bottom surface of the flange when the thicker body portion is located within the opening on the flange.

In an embodiment of the invention, the removable handle connects to the attachment point with a locking mechanism to help keep the removable handle secure and in place while also allowing for easy removal.

The locking mechanism to help keep the removable handle secure and in place while also allowing for easy removal comprises an elongated locking bar moveable horizontally from an unlocked position to a locked position where in the locked position, an end of the locking bar is located beneath and in contact with the bottom surface of the flange on the attachment point and wherein the elongated locking bar is biased to the locking position.

The means for moving the elongated locking bar horizontally from an unlocked position to a locked position comprises an actuator that is located away from the natural placement of a user's thumb so as to prevent accidental movement of the actuator and accidental disengagement of the removable handle from the attachment point on the cookware container. A trigger section on the actuator is sized and shaped to permit engagement with a user's finger. The trigger section on the actuator is of sufficient height, to prevent the user's hand from being placed too close to the cookware container.

The removable handle can be used to save space and provide a secure and tight connection with the container when engaged.

The removable handle provides versatility—the same cookware container may be used for both cooking the meal and serving or storing the meal since the ability to remove the handle allows the user to conserve surface area on the table and in the fridge.

In another embodiment the removable handle for removable attachment to an attachment point on a cookware container comprises an elongated handle section, the elongated handle section having first and second ends. At the first end of the handle section there is means for removable attachment to the attachment point on a cookware container and a means for locking the removable handle to the attachment point. The attachment point on the cookware container comprises a bracket that has a depending section attached to a side wall of the cookware container and a flange at the top edge of the depending section and extending outwardly away from the side wall of the cookware container. A centrally located non-circular opening is provided through the flange. The opening is sized and shaped to engage with the means for removable attachment on the handle. The means for removable attachment to the attachment point comprises a horizontal body section having top and bottom surfaces and first and second ends. On the bottom surface of the body section adjacent the first end is a thicker portion of the body section. The thicker portion is sized and shaped to fit snugly with the non-circular opening on the flange. A horizontal tab section extends outwardly from the thicker portion of the body section to extend under the bottom surface of the flange toward the cookware container when the thicker body portion is located within the non-circular opening on the flange. A means for locking the removable handle to the attachment point is provided comprising an elongated locking bar moveable horizontally from an unlocked position to a locked position where an end of the locking bar is located beneath and in contact with the bottom surface of the flange.

Further features of the invention will be described or will become apparent in the course of the following detailed description.

BRIEF DESCRIPTION OF THE DRAWINGS

In order that the invention may be more clearly understood, the preferred embodiments thereof will now be described in detail by way of example, with reference to the accompanying drawings, in which.

Similar references are used in different figures to denote similar components.

DETAILED DESCRIPTION OF THE PREFERRED EMBODIMENT

Figure 1:
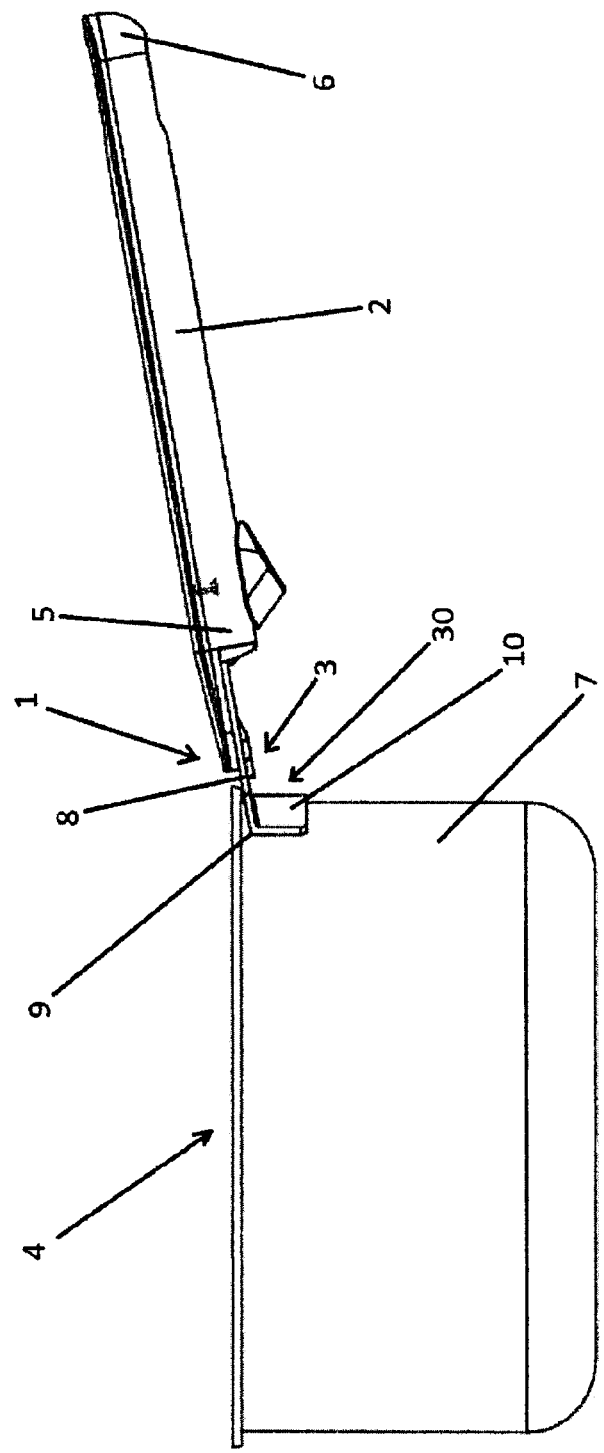
FIG. 1 is a schematic perspective drawing of one embodiment of a removable handle according to the present invention connected and engaged at the attachment point of a container.

Referring to FIG. 1, an embodiment of a removable handle shown attached to one cookware container in a set of containers according to the present invention is generally indicated at 1. The removable handle 1 in the embodiment shown comprises an elongated handle section 2 having a length and width that can vary depending on the size range of the corresponding cookware. The elongated handle section 2 has first end 5 and second end 6. The embodiment illustrated shows the handle section 2 being straight from the first end 5 to second end 6 but it can also be slightly curved from end to end. At the first end 5 of the elongated handle section 2 there is the means for removable attachment generally indicated at 2A to the attachment point 3 on a corresponding cookware container 4, and a means for locking the removable handle 1 to the attachment point 3.

The attachment point 3 on the cookware container 4 consists of a bracket 30 that has depending section 10 attached to a side wall 7 of the cookware container 4 and a flange 8 at the top edge 9 of the depending section 10 and extending outwardly from the side wall 7 of the cookware container 4. A centrally located non-circular opening 11 is provided through the flange 8. The opening 11 in the embodiment illustrated is elongated and generally orientated with its longitudinal axis perpendicular to a longitudinal axis of the elongated handle section and generally parallel to the side wall 7 of the cookware container 4. The opening 11 is sized and shaped to engage with the means for removable attachment on the handle.

Figure 2:
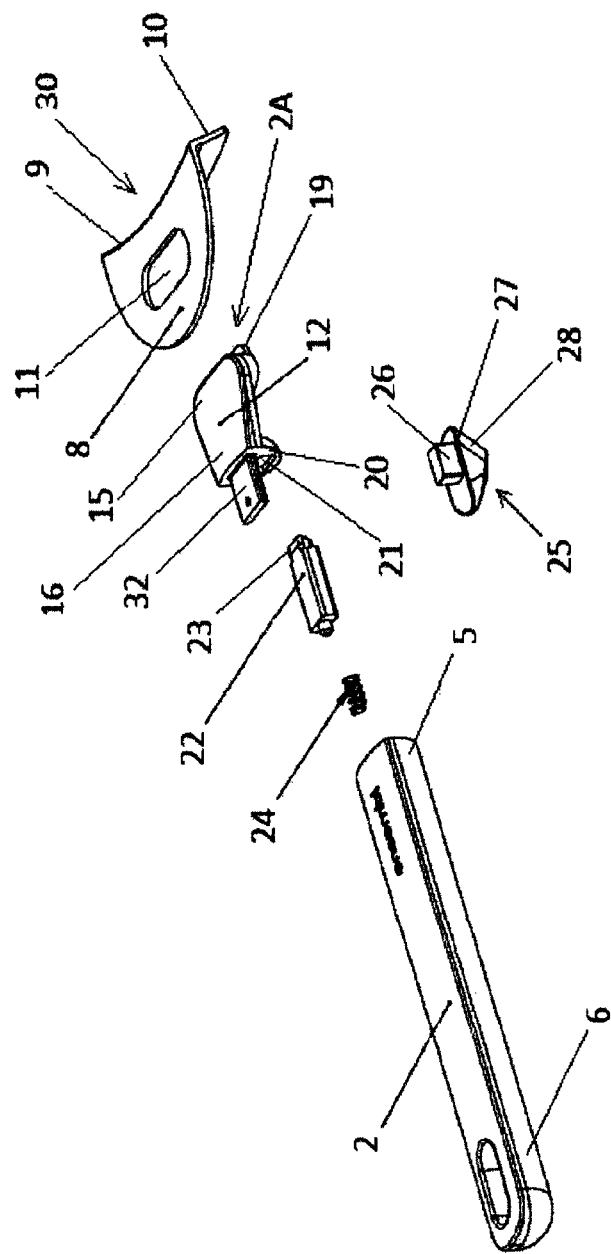
FIG. 2 is an assembly drawing of the removable handle and attachment point according to FIG. 1.
Figure 3:
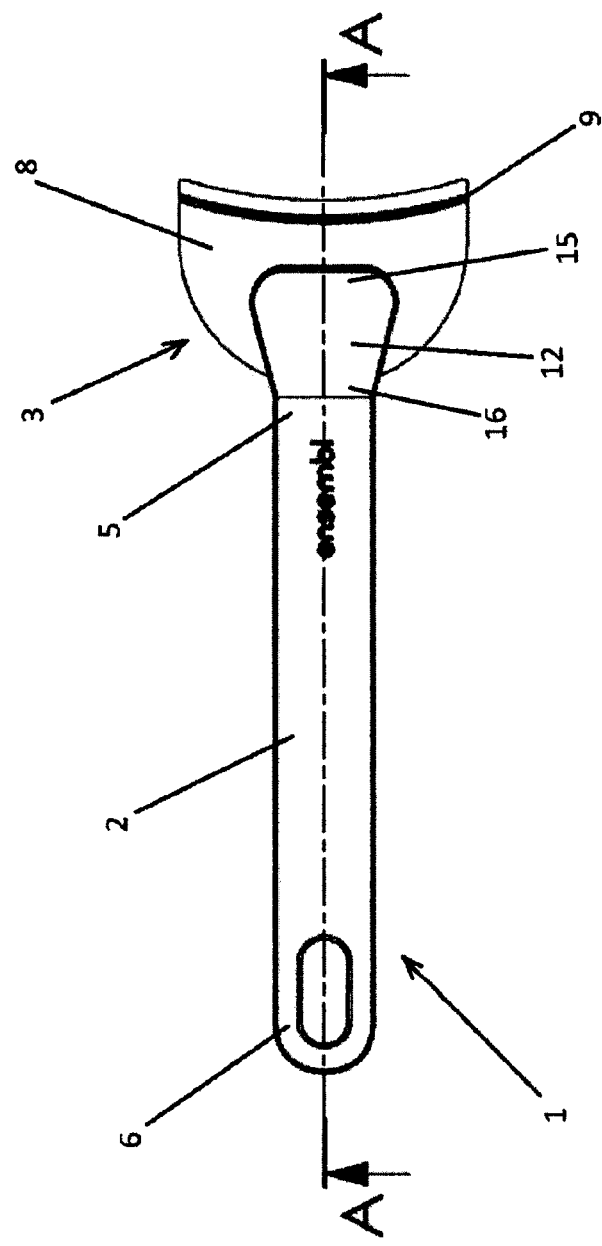
FIG. 3 is a top plan view of the removable handle and attachment point shown in FIG. 1.
Figure 4:
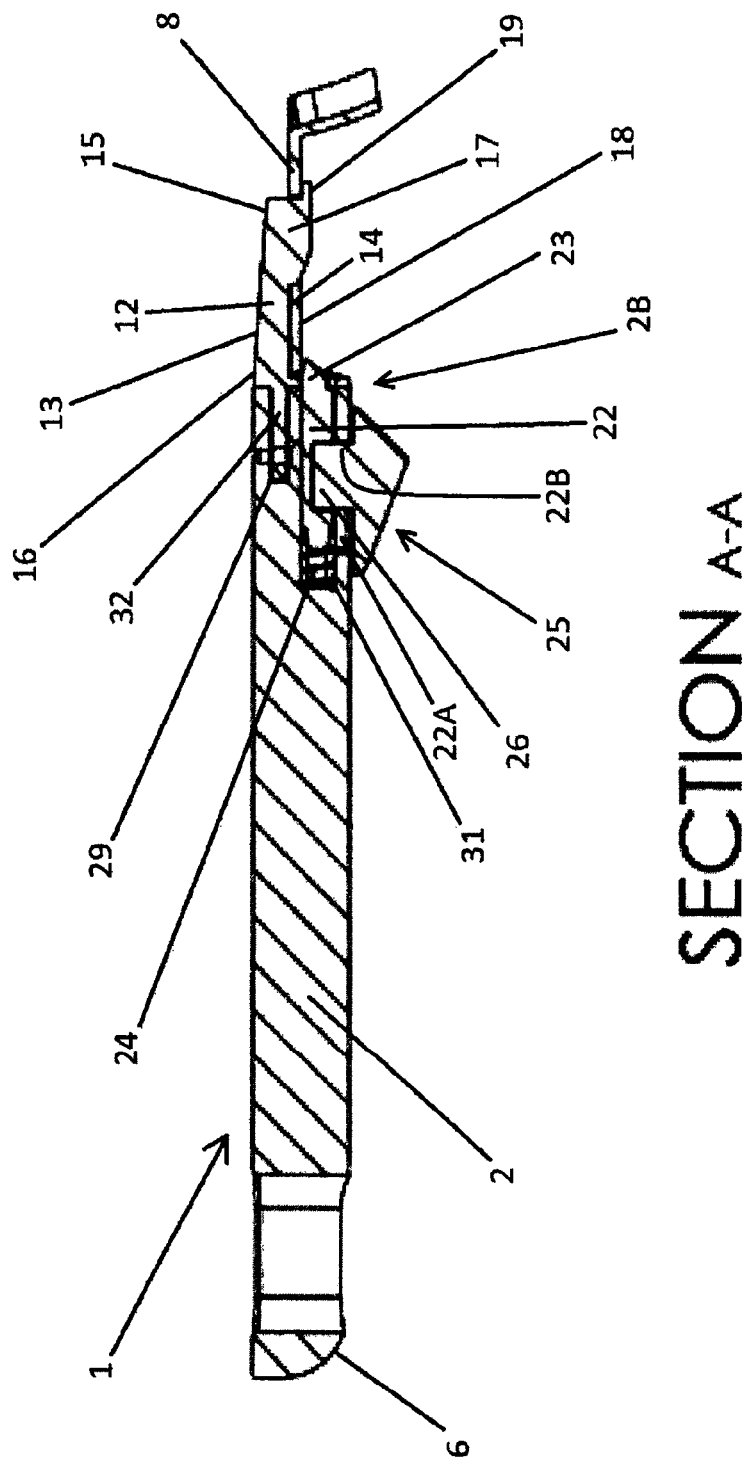
FIG. 4 is a cross section of the removable handle and attachment point along line A-A in FIG. 3.
Figure 5:
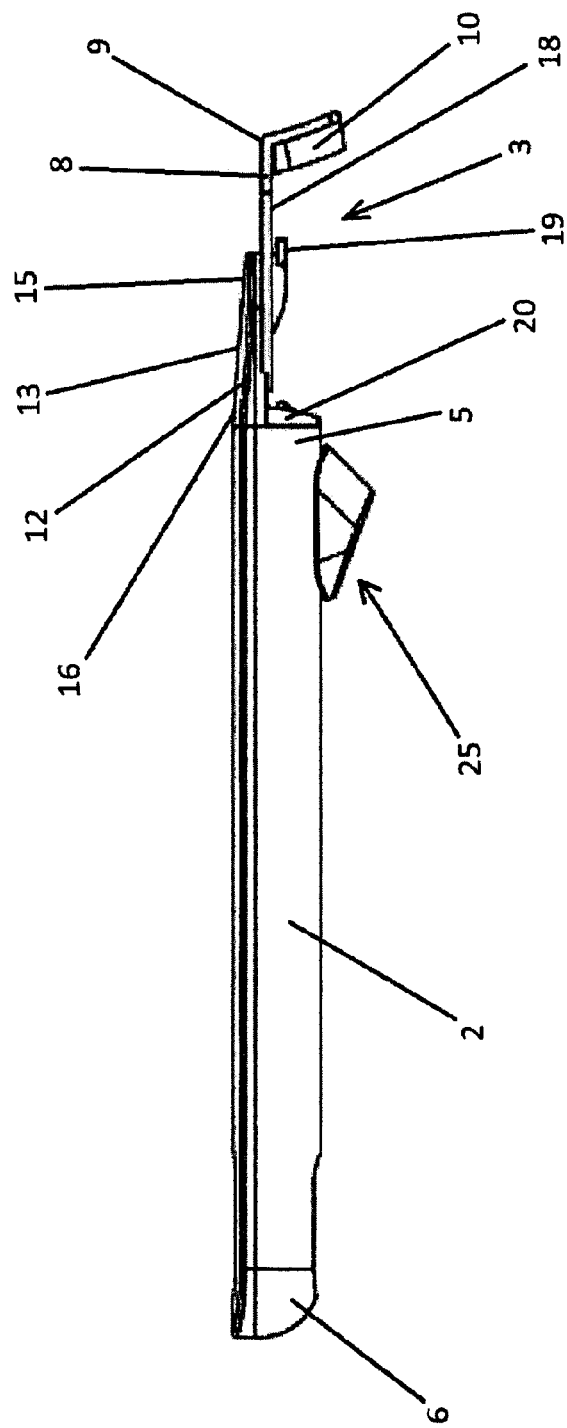
FIG. 5 is a front plan view the removable handle and attachment point of FIG. 3.
Figure 6:
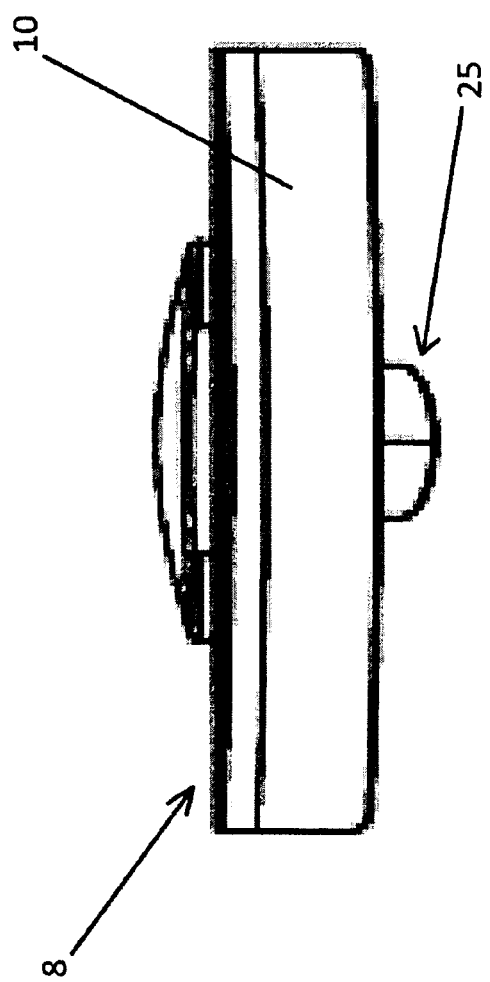
FIG. 6 is a right side plan view of the removable handle and attachment point of FIG. 3.
Figure 7:
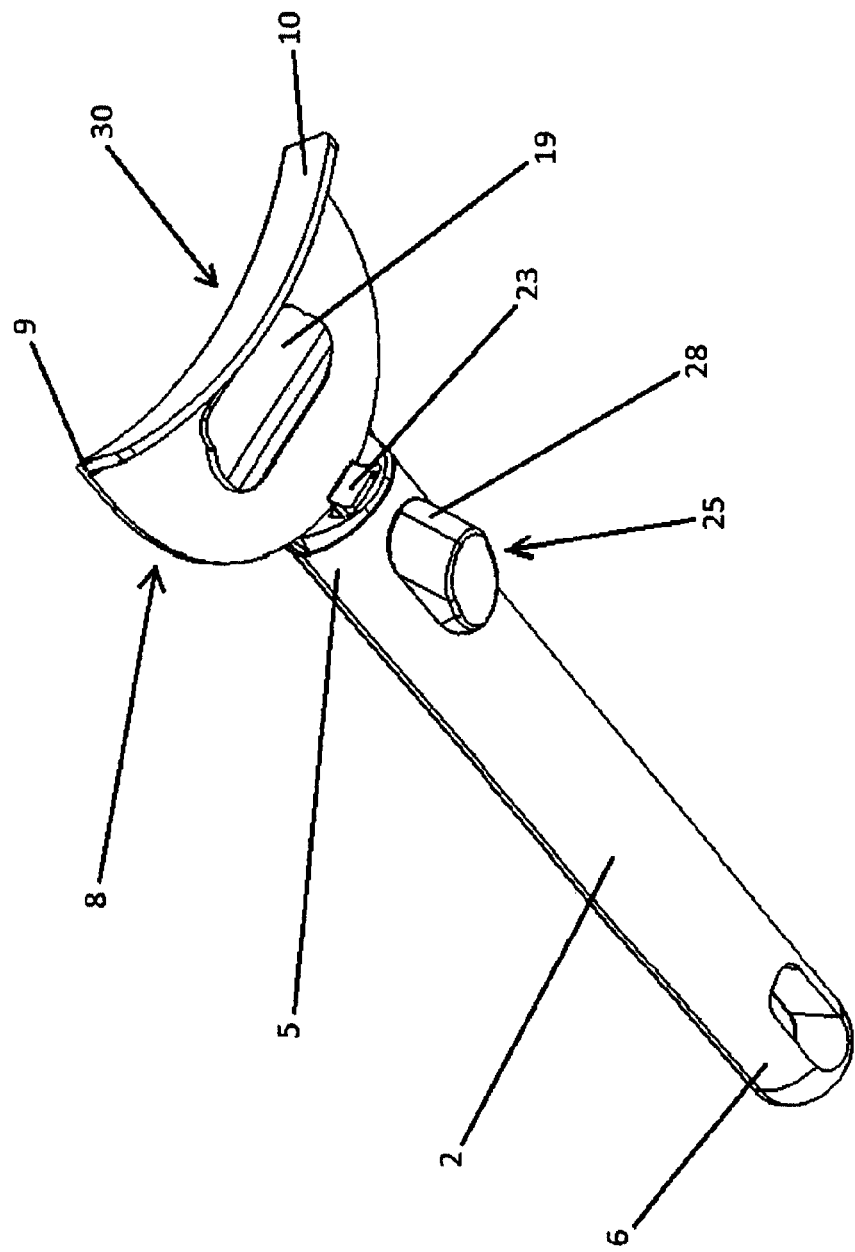
FIG. 7 is a bottom perspective view of the removable handle and attachment point of FIG. 3.

Referring to FIGS. 2, 3 and 4 which show the removable handle and attachment point in cross section along line A-A in FIG. 3, there is the means for removable attachment 2A to the attachment point 3 on a corresponding cookware container 4, and a means for locking the removable handle to the attachment point located adjacent the first end 5 of handle section 2. The means for removable attachment 2A to the attachment point 3 comprises a horizontal body section 12 having top 13 and bottom 14 surfaces and first and second ends 15, 16.

On the bottom surface 14 of the body section 12 adjacent the first end 15 is a thicker portion 17 of the body section 12 said thicker portion 17 sized and shaped to fit snugly with the opening 11 on the flange 8 and that, in the embodiment illustrated, extends below the bottom surface 18 of the flange 8. The width of the first end 15, the thicker portion 17 and opening 11 are sized and shaped to minimize any wobble, side to side rock or unintentional lateral movement of the removable handle relative to the attachment point. In the embodiment illustrated the elongated opening 11 is approximately twice as long as it is wide, the elongated opening 11 has rounded corners and the width of the first end 15 of the body section 12 and thicker section 17 is less than the width of flange 8. The horizontal cross section of the thicker section 17 is the same shape and slightly smaller than the opening 11 in the flange 8 so that it fits snugly within the opening. A horizontal tab section 19 extends outwardly from the first end 15 of the body section 12 adjacent the bottom surface 14 of the thicker portion 17 of the body section 12 to extend towards the cookware container 4 and under the bottom surface 18 of the flange 8 when the thicker body portion 17 is located within the opening 11 on the flange 8.

Referring to FIG. 2, at the second end 16 of the body section 12 is depending guide flange 20 having an opening 21 to accommodate means for locking the removable handle generally indicated at 2B to the attachment point 3. The means for locking the removable handle 2B to the attachment point 3 comprises an elongated locking bar 22 moveable horizontally through the opening 21 in guide flange 20 from an unlocked position to a locked position where an end 23 of the locking bar 22 is located beneath and in contact with the bottom surface 18 of the flange 8. As best shown in FIG. 4, an axial channel 31 in handle section 2 allows elongated locking bar 22 to move horizontally from an unlocked position to a locked position. Spring 24 located at the end of channel 31 biases the elongated locking bar 22 to the locking position.

An actuator 25 is located on the bottom surface of elongated locking bar 22 and depending below the handle section 2 to permit the actuator 25 to be pulled back to move elongated locking bar 22 to an unlocked position and allow removal of the removable handle 1. The actuator 25 is located on the bottom of the elongated handle away from natural placement of a user's thumb so as to prevent accidental movement of the actuator 25 and accidental disengagement of the removable handle 1 from the attachment point 3 on the cookware container 4. In order for the actuator 25 to be pulled back there is a slot 22A in the bottom surface of the handle section 2 in communication with the axial channel 31. A stem 26 extends downwardly from elongated locking bar 22 through the slot 22A in the bottom surface of the handle section 2. At the distal end 27 of stem 26 is a trigger section 28 sized and shaped to permit engagement with a user's finger. The trigger section 28 on the actuator is of sufficient height to prevent the user's hand from being placed too close to the cookware container 4.

The means for removable attachment 2A to the attachment point 3 is fastened to the handle section 2 by any suitable means. In the embodiment illustrated a tab 32 extends outwardly from the second end 16 of the horizontal body section 12 and is sized and shaped to fit into a corresponding sized slot 29 in the first end 5 of the handle section 2 (see FIG. 4). The tab 32 is secured in slot 29 by any suitable fastener or adhesive.

The opening 11 in the flange 8 and the thicker portion 17 on the body section 12 need to be sized and shaped to create a secure connection. As noted above in the embodiment illustrated, the width of the first end 15 of the body section 12 and thicker section 17 is less than the width of flange 8. The horizontal cross section of the thicker section 17 is the same shape and slightly smaller than the opening 11 in the flange 8 so that it fits snugly within the opening. To attach the removable handle 1 to the attachment point 3, the horizontal tab section 19 and the thicker portion 17 of the body section 12 are inserted at an angle into opening 11 on the flange 8 so that horizontal tab section 19 extends under the bottom surface 18 of the flange 8. At the same time the trigger section 28 on actuator 25 is pulled back so that the bottom surface of the body section 12 can contact the top surface of the flange 8. The removable handle 1 with horizontal tab section 19 under the bottom surface of the flange 8 is lowered so the upper body section 12 is resting on the top surface of the flange 8 with the thicker portion 17 of the body section 12 snugly located in the opening 11. The trigger section 28 is then released and elongated locking bar 22 moves horizontally due to the spring bias from an unlocked position to a locked position under the bottom surface of the flange 8 with actuator 25 stopped against an end 22B of slot 22A.

The handle 1 is released from the container 4 by pulling the trigger section 28 on actuator 25 which pulls the elongated locking bar 22 from a locked position under the flange 8 to an unlocked position. In the embodiment illustrated the handle 1 is then lifted at an angle upwards so that the horizontal tab section 19 and the thicker portion 17 of the body section 12 are released from opening 11 on the flange 8. In this embodiment if the trigger section 28 is pulled back but the handle 1 is not angled upward, the handle 1 will not release. This is a safety feature to ensure in this embodiment that there is no accidental release of the handle 1 while lifting the container 4.

In the embodiment illustrated the horizontal body section 12, the elongated locking bar 22 and the bracket 30 are manufactured from stainless steel. The actuator and the elongated handle section 2 are manufactured from non-heat conductive material for example a high temperature nylon such as Bakelite™.

Figure 8:
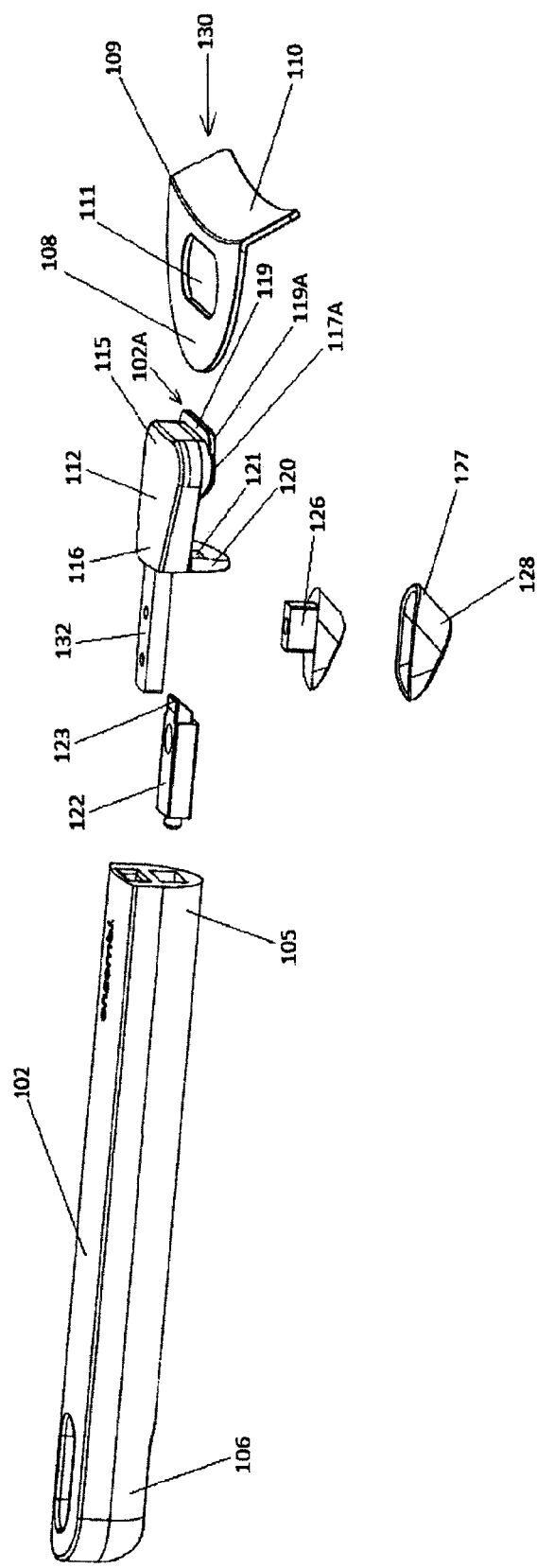
FIG. 8 is an assembly drawing of a more robust removable handle and attachment point in the form of a bracket intended for connection to a cookware container according to the present invention.
Figure 9:
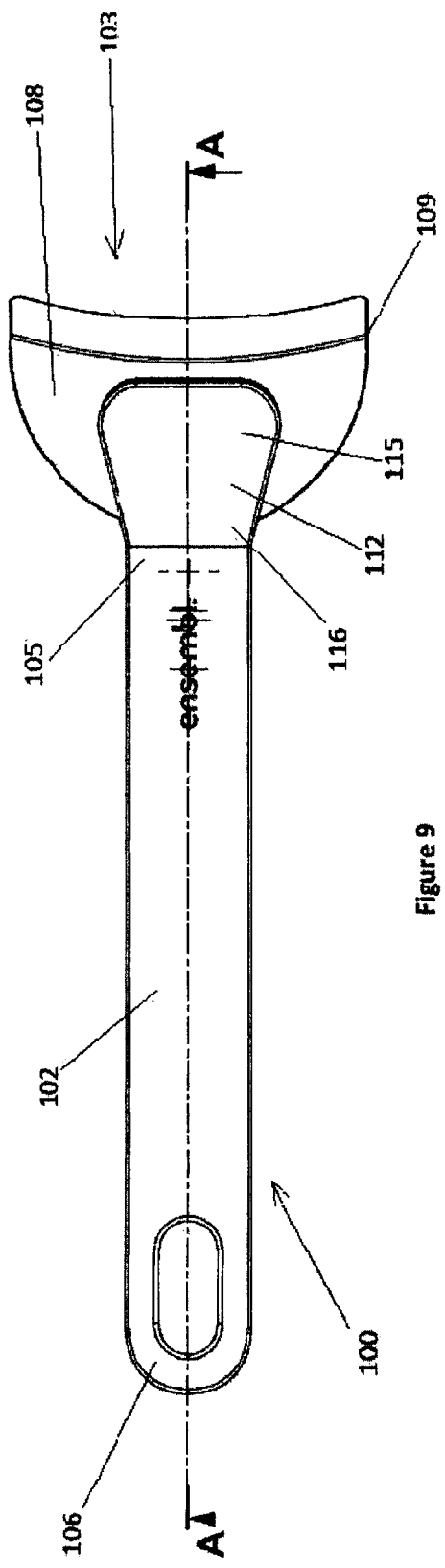
FIG. 9 is a top plan view of the removable handle of FIG. 8 connected to the attachment point.
Figure 10:
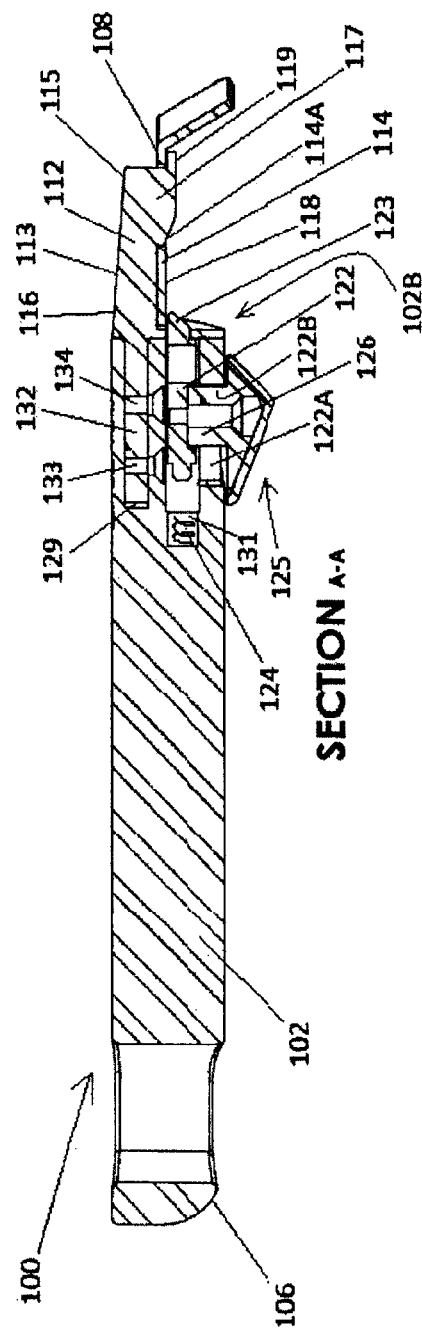
FIG. 10 is a cross section of the removable handle and attachment point along line A-A in FIG. 9.

Referring to FIGS. 8-10, another embodiment of a removable handle according to the present invention, generally indicated at 100, and having a slightly more robust design potentially suitable with larger cookware is shown. The removable handle 100 in the embodiment shown comprises an elongated handle section 102 having a length and width that can vary depending on the size range of the corresponding cookware. The elongated handle section 102 has first end 105 and second end 106. The embodiment illustrated shows the handle section 102 being straight from the first end 105 to second end 106 but it can also be slightly curved from end to end. At the first end 105 of the elongated handle section 102 there is the means for removable attachment to the attachment point 103 on a corresponding cookware container (not shown), and a means for locking the removable handle 100 to the attachment point 103.

The attachment point 103 on the cookware container consists of a bracket 130 that has depending section 110 to be attached to a side wall of the cookware container and a flange 108 at the top edge 109 of the depending section 110 and extending outwardly from the side wall of the cookware container. A centrally located non-circular opening 111 is provided through the flange 108. The opening 111 in the embodiment illustrated is elongated and generally orientated with its longitudinal axis with its longitudinal axis perpendicular to a longitudinal axis of the elongated handle section and generally parallel to the side wall of the cookware container. The opening 111 is sized and shaped to engage with the means for removable attachment on the handle.

Referring to FIGS. 9 and 10 which show the removable handle and attachment point in cross section along line A-A in FIG. 9, there is the means for removable attachment generally indicated at 102A to the attachment point 103 on a corresponding cookware container, and a means for locking the removable handle generally indicated at 102B to the attachment point 103 located adjacent the first end 105 of handle section 102. The means for removable attachment 102A to the attachment point 103 comprises a horizontal body section 112 having top 113 and bottom 114 surfaces and first and second ends 115, 116. The bottom surface 114 of the horizontal body section has chamfered edges 114A for smoother entry into the opening 111.

On the bottom surface 114 of the body section 112 adjacent the first end 115 is a thicker portion 117 of the body section 112 said thicker portion 117 sized and shaped to fit snugly with the opening 111 on the flange 108 and that, in the embodiment illustrated, extends below the bottom surface 118 of the flange 108 and has chamfered edges 117A for smoother entry into the opening 111. The width of the first end 115, the thicker portion 117 and opening 111 are sized and shaped to minimize any wobble, side to side rock or unintentional lateral movement of the removable handle relative to the attachment point. In the embodiment illustrated the opening 111 is approximately twice as long as it is wide, the opening 111 has rounded corners and the width of the first end 115 of the body section 112 and thicker section 117 is less than the width of flange 108. The horizontal cross section of the thicker section 117 is the same shape and slightly smaller than the opening 111 in the flange 108 so that it fits snugly within the opening. A horizontal tab section 119 extends outwardly from the first end 115 of the body section 112 adjacent the bottom surface 114 of the thicker portion 117 of the body section 112 to extend towards the cookware container and under the bottom surface 118 of the flange 108 when the thicker body portion 117 is located within the opening 111 on the flange 108. The horizontal tab section 119 has chamfered edges 119A for smoother entry into the opening 111.

Referring to FIGS. 8 and 10, at the second end 116 of the body section 112 is depending guide flange 120 having an opening 121 to accommodate the means for locking the removable handle 102B to the attachment point 103. The means for locking the removable handle 102B to the attachment point 103 comprises an elongated locking bar 122 moveable horizontally through the opening 121 in guide flange 120 from an unlocked position to a locked position where an end 123 of the locking bar 122 is located beneath and in contact with the bottom surface 118 of the flange 108. As best shown in FIG. 10, an axial channel 131 in handle section 102 allows elongated locking bar 122 to move horizontally from an unlocked position to a locked position. Spring 124 located at the end of channel 131 biases the elongated locking bar 122 to the locking position.

An actuator 125 is located on the bottom surface of elongated locking bar 122 and depending below the handle section 102 to permit the actuator 125 to be pulled back to move elongated locking bar 122 to an unlocked position and allow removal of the removable handle 100. In order for the actuator 125 to be pulled back there is a slot 122A in the bottom surface of the handle section 102 in communication with the axial channel 131. A stem 126 extends downwardly from elongated locking bar 122 through the slot 122A in the bottom surface of the handle section 102. At the distal end 127 of stem 126 is a trigger section 128 sized and shaped to permit engagement with a user's finger.

The means for removable attachment to the attachment point is fastened to the handle section 102 by any suitable means. In the embodiment illustrated a tab 132 extends outwardly from the second end 116 of the horizontal body section 112 and is sized and shaped to fit into a corresponding sized slot 129 in the first end 105 of the handle section 102 (see FIG. 10). The tab 132 is secured in slot 129 by any suitable fastener or adhesive. In the embodiment illustrated two fasteners 133,134 retain tab 132 in slot 129.

The opening 111 in the flange 108 and the thicker portion 117 on the body section 112 need to be sized and shaped to create a secure connection. As noted above in the embodiment illustrated, the width of the first end 115 of the body section 112 and thicker section 117 is less than the width of flange 108. The horizontal cross section of the thicker section 117 is the same shape and slightly smaller than the opening 111 in the flange 108 so that it fits snugly within the opening. To attach the removable handle 100 to the attachment point 103, the horizontal tab section 119 and the thicker portion 117 of the body section 112 are inserted at an angle into opening 111 on the flange 108 so that horizontal tab section 119 extends under the bottom surface 118 of the flange 108. At the same time the trigger section 128 on actuator 125 is pulled back so that the bottom surface of the body section 112 can contact the top surface of the flange 108. The removable handle 100 with horizontal tab section 119 under the bottom surface of the flange 108 is lowered so the upper body section 112 is resting on the top surface of the flange 108 with the thicker portion 117 of the body section 112 snugly located in the opening 111. The trigger section 128 is then released and elongated locking bar 122 moves horizontally due to the spring bias from an unlocked position to a locked position under the bottom surface of the flange 108.

The handle 100 is released from the container by pulling the trigger section 128 on actuator 125 which pulls the elongated locking bar 122 from a locked position under the flange 108 to an unlocked position. The handle 100 can then be lifted at an angle upwards so that the horizontal tab section 119 and the thicker portion 117 of the body section 112 are released from opening 111 on the flange 108.

In the embodiment illustrated the horizontal body section 112, the elongated locking bar 122 and the bracket 130 are manufactured from stainless steel. The actuator and the elongated handle section 102 are manufactured from a non-heat conducting material for example high temperature nylon such as Bakelite™.

While the principles of the invention have been shown and described in connection with specific embodiments, it is to be understood that such embodiments are by way of example and are not limiting as is evident from the foregoing description, and certain aspects of the present invention are not limited by the particular details illustrated in the drawings. Other modifications and applications, or equivalents, will occur to those skilled in the art. The terms "having", "comprising" and "including" and similar terms as used in the foregoing specification are used in the sense of "optional" or "may include" and not as "required". Many changes, modifications, variations and other uses and applications of the present construction will, however, become apparent to those skilled in the art after considering the specification and attached drawings. All such changes, modifications, variations and other uses and applications which do not depart from the spirit and scope of the invention are deemed to be covered by the invention which is limited only by the claims that follow. The scope of the disclosure is not intended to be limited to the embodiments shown herein, but is to be accorded the full scope consistent with the claims, wherein reference to an element in the singular is not intended to mean "one and only one" unless specifically so stated, but rather one or more. All structural and functional equivalents to the elements of the embodiment described throughout the disclosure that are known or later come to be known to those of ordinary skill in the art are expressly incorporated herein by reference and intended to be encompassed by the claims.

The embodiments of the invention in which an exclusive property or privilege is claimed are defined as follows:

1. A cookware container with a removable handle,
   a) the cookware container having a base and a peripheral side wall extending from said base wherein said removable handle is adapted for removable attachment to an attachment point on the cookware container, said attachment point on the cookware container comprising a bracket that has a depending section attached to said side wall of the cookware container and a flange at the top edge of the depending section and extending outwardly away from the side wall of the cookware container and wherein a centrally located non-circular opening is provided through the flange, said opening sized and shaped to engage with means for removable attachment on the handle and said opening being elongated and generally orientated with its longitudinal axis perpendicular to a longitudinal axis of the elongated handle section of the removable handle; and
   b) the removable handle comprising an elongated handle section, the elongated handle section having first and second ends, wherein at the first end of the handle section there is means for removable attachment to the attachment point on the cookware container and means for locking the removable handle to the attachment point, wherein
      i) the means for removable attachment to the attachment point comprising a horizontal body section having top and bottom surfaces and first and second ends, on the bottom surface of the horizontal body section adjacent the first end is a depending thicker portion of the horizontal body section, wherein a width of each of the first end of the horizontal body section and the thicker portion is less than a width of the flange on the sidewall of the cookware container and said thicker portion sized and shaped whereby a horizontal cross section of the thicker portion is the same shape and smaller than the non-circular opening in the flange to fit snugly with the non-circular opening on the flange with the surrounding bottom surface of the horizontal body section placed against a top surface of the flange and a horizontal tab section that extends outwardly from the thicker portion of the horizontal body section and that extends under a bottom surface of the flange toward the cookware container when the thicker body portion is located within the non-circular opening on the flange; and
      ii) the means for locking the removable handle to the attachment point comprising an elongated locking bar moveable by an actuator horizontally from an unlocked position to a locked position where an end of the locking bar is located beneath and in contact with the bottom surface of the flange.

2. The cookware container according to claim 1 being one in a set of cookware containers wherein the removable handle is sized and adapted to connect to a range of sizes and weights of cookware containers in the set.

3. The cookware container according to claim 1 wherein the elongated locking bar on the removable handle is biased to the locking position.

4. The cookware container according to claim 1 wherein the actuator is sized and shaped to permit engagement with a user's finger and located outside the natural placement of a user's thumb on a bottom surface of the elongated locking bar and depending below the elongated handle section so as to prevent accidental trigger of the actuator and accidental disengagement of the removable handle from the attachment point on the cookware container.

5. The cookware container according to claim 1 where the elongated locking bar is moveable in an axial channel in the handle section when activated by an actuator connected to the elongated locking bar.

6. The cookware container according to claim 5 wherein a stem depends from the elongated locking bar through a locking bar slot in the bottom surface of the elongated handle section that is in communication with the axial channel and connects to the actuator.

7. The cookware container according to claim 6, wherein a trigger section on the actuator is of sufficient height to prevent the user's finger from being placed too close to the cookware container.

8. The cookware container according to claim 6, wherein the stem is comprised of stainless steel.

9. The cookware container according to claim 1, wherein the elongated handle section is curved along its length.

10. The cookware container according to claim 1, wherein a body section tab extends outwardly from the second end of the horizontal body section and is sized and shaped to fit into a corresponding sized slot in the first end of the handle section and secured with fasteners or screws.

11. The cookware container according to claim 1, wherein the bottom surface of the horizontal body section has chamfered edges.

12. The cookware container according to claim 1, wherein the bottom surface of the thicker body portion of the horizontal body section has chamfered edges.

13. The cookware container according to claim 1, wherein the bottom surface of the horizontal tab of the horizontal body section has chamfered edges.

14. The cookware container according to claim 1, wherein the elongated handle section is fabricated from a material resistant to heat transfer.

15. The cookware container according to claim 14, wherein the elongated handle section is fabricated from a high temperature nylon.

16. The cookware container according to claim 1, wherein the actuator is comprised of a high temperature nylon.

17. The cookware container according to claim 1, wherein the elongated locking bar, the horizontal body section and flange are comprised of stainless steel.

18. A removeable handle for use with a cookware container according to claim 1 wherein the cookware container is one in a set of cookware containers and wherein the removeable handle is sized and adapted to connect to a range of sizes and weights of cookware containers in the set.

19. The cookware container according to claim 1, wherein the thicker portion engages with the interior perimeter of the non-circular opening adjacent the bottom surface of the flange to fit snugly with the non-circular opening on the flange.

20. The cookware container according to claim 19, wherein the non-circular opening has rounded corners.

* * * * *